United States Patent
Joost et al.

(10) Patent No.: US 12,359,586 B2
(45) Date of Patent: Jul. 15, 2025

(54) DISLOCATOR CHEMISTRIES FOR TURBINE ABRADABLE OR MACHINABLE COATING SYSTEMS

(71) Applicant: Raytheon Technologies Corporation, Farmington, CT (US)

(72) Inventors: William J. Joost, Worcester, MA (US); Kara J. Bridges, San Diego, CA (US); Christopher W. Strock, Boothbay Harbor, ME (US); Imelda P. Smyth, North Palm Beach, FL (US); Richard Wesley Jackson, Mystic, CT (US)

(73) Assignee: RTX Corporation, Farmington, CT (US)

( * ) Notice: Subject to any disclaimer, the term of this patent is extended or adjusted under 35 U.S.C. 154(b) by 19 days.

(21) Appl. No.: 18/013,959

(22) PCT Filed: Jul. 1, 2021

(86) PCT No.: PCT/US2021/040074
§ 371 (c)(1),
(2) Date: Dec. 30, 2022

(87) PCT Pub. No.: WO2022/026115
PCT Pub. Date: Feb. 3, 2022

(65) Prior Publication Data
US 2023/0296029 A1    Sep. 21, 2023

Related U.S. Application Data

(60) Provisional application No. 63/048,023, filed on Jul. 3, 2020.

(51) Int. Cl.
*F01D 11/12* (2006.01)
*C04B 41/00* (2006.01)
(Continued)

(52) U.S. Cl.
CPC ........ *F01D 11/122* (2013.01); *C04B 41/0072* (2013.01); *C04B 41/009* (2013.01);
(Continued)

(58) Field of Classification Search
None
See application file for complete search history.

(56) References Cited

U.S. PATENT DOCUMENTS 6,235,370 B1   5/2001  Merrill et al.
10,458,023 B2  10/2019  Kirby
(Continued)

FOREIGN PATENT DOCUMENTS

CN   105086780 A   11/2015
CN   106517792 A    3/2017
(Continued)

OTHER PUBLICATIONS

"Mullite, 3Al2O3—2SiO2," Matweb Material Property Date, https://www.matweb.com/search/DataSheet.aspx? MatGUID=6ff3fda0bf744c93b4e423806faec494&ckck=1. (Year: 2024).*
(Continued)

*Primary Examiner* — David Sample
(74) *Attorney, Agent, or Firm* — Bachman & LaPointe, P.C.

(57) ABSTRACT

A coated article (20;60) includes a substrate (22) and a coating (24;62) on the substrate. The coating includes at least a first layer (30). The first layer has: a matrix (50); and a filler (52) at 2.0% to 40% by volume in the first layer. The first layer is selected from alkaline earth or transition metal (M) tungstates (MWO4); alkaline earth molybdates ($MMoO_4$); rare earth (RE) phosphates ($REPO_4$); and combinations thereof.

19 Claims, 2 Drawing Sheets

(51) Int. Cl.
  *C04B 41/45*    (2006.01)
  *C04B 41/50*    (2006.01)
  *C04B 41/52*    (2006.01)
  *C23C 4/02*     (2006.01)
  *C23C 4/10*     (2016.01)
  *C23C 4/134*    (2016.01)

(52) U.S. Cl.
  CPC ...... *C04B 41/4545* (2013.01); *C04B 41/4582* (2013.01); *C04B 41/5024* (2013.01); *C04B 41/5096* (2013.01); *C04B 41/522* (2013.01); *C23C 4/02* (2013.01); *C23C 4/10* (2013.01); *C23C 4/134* (2016.01); *F05D 2230/90* (2013.01)

(56) References Cited

U.S. PATENT DOCUMENTS

| | | | |
|---|---|---|---|
| 2002/0189496 | A1 | 12/2002 | Davis et al. |
| 2004/0096314 | A1* | 5/2004 | Kool .................. G01K 11/06 374/E11.006 |
| 2012/0328886 | A1 | 12/2012 | Schmidt et al. |
| 2016/0332922 | A1 | 11/2016 | Tang et al. |
| 2016/0333454 | A1 | 11/2016 | Tang et al. |
| 2017/0183782 | A1* | 6/2017 | Kirby ................ C04B 35/62222 |
| 2019/0093497 | A1 | 3/2019 | Ndamka et al. |
| 2019/0284673 | A1* | 9/2019 | Landwehr .......... C23C 28/3455 |
| 2020/0024974 | A1 | 1/2020 | Jackson |
| 2020/0055789 | A1* | 2/2020 | Smyth ................ C04B 41/4543 |
| 2021/0188720 | A1* | 6/2021 | Ding .................... F01D 5/282 |
| 2022/0333250 | A1* | 10/2022 | Strock ................... C03B 35/12 |

FOREIGN PATENT DOCUMENTS

| | | | | |
|---|---|---|---|---|
| CN | 107245687 | A | 10/2017 | |
| DE | 3612135 | A1 | 10/1987 | |
| EP | 3404215 | A1 * | 11/2018 | ............ F01D 11/005 |
| RU | 2554183 | C1 | 6/2015 | |

OTHER PUBLICATIONS

Materials Explorer, LaPO4, https://next-gen.materialsproject.org/materials/mp-3962 visited Aug. 28, 2024. (Year: 2024).*

Wada et al., "Mass transfer in polycrystalline ytterbium disilicate under oxygen potential gradients at high temperatures," Acta Materialia, 135 (2017) 372-381. (Year: 2017).*

Davis et al., "The Role of Monazite in Oxide Ceramic Matrix Composites," downloaded Aug. 28, 2024. (Year: 2024).*

Arthur et al., "Design of Thermally Reliable Environmental Barrier Coating for a SiC/SiC Ceramic Matrix Composites," International Journal of Composite Materials, 2013, 3(6): 191-197. (Year: 2013).*

S.K. Arora et al., "Vickers Micromechanical Indentation of BaMoO4 Crystals", Journal of Materials Science, Jan. 1984, pp. 297-302, Chapman and Hall, Ltd., London, Great Britain.

W.W. Ge et al., "Thermal and Mechanical Properties of BaWO4 Crystal", Journal of Applied Physics, Jul. 1, 2005, AIP Publishing LLC, Melville, New York.

Belli, P. et al., "Radioactive contamination of ZnWO4 crystal scintillators", Nuclear Instruments and Methods in Physics Research Section A: Accelerators, Spectrometers, Detectors and Associated Equipment, Jan. 11-21, 2011, pp. 31-38, vols. 626-627, Elsevier B.V., Amsterdam, The Netherlands.

Mogilevsky, P., Zaretsky, E.B., Parthasarathy, T.A et al., "Composition, lattice parameters, and room temperature elastic constants of natural single crystal xenotime from Novo Horizonte", Phys Chem Minerals, Nov. 3, 2006, pp. 691-698 vol. 33, Springer-Verlag GmbH, Berlin Germany.

"Barium & Strontium tungstate-molybdate—Crystals for Raman Shift", Jun. 2019, EKSMA Optics, UAB , Vilnius, Lithuania.

Peter E.D. Morgan, David B. Marshall, Robert M. Housley, "High-temperature stability of monazite-alumina composites", Materials Science and Engineering: A, Jun. 1, 1995, pp. 215-222, vol. 195, Elsevier B.V., Amsterdam, the Netherlands.

Xiaorui Ren et al., "Thermal Conductivity and Mechanical Properties of YSZ/LaPO4 Composites", Journal of Materials Science, Dec. 10, 2014, pp. 2243-2251, Springer-Verlag GmbH, Berlin Germany.

Mohsen Hajian Foroushani et al., "Porosity Analysis and Oxidation Behavior of Plasma Sprayed YSZ and YSZ/LaPO4 Abradable Thermal Barrier Coatings", Ceramic International, Jul. 9, 2016, pp. 15868-15875, vol. 42, Elsevier B.V., Amsterdam, the Netherlands.

Search Report and Written Opinion dated Dec. 22, 2021 for International Application No. PCT/US2021/040074.

* cited by examiner

DISLOCATOR CHEMISTRIES FOR TURBINE ABRADABLE OR MACHINABLE COATING SYSTEMS

CROSS-REFERENCE TO RELATED APPLICATION

Benefit is claimed of U.S. Patent Application No. 63/048,023, filed Jul. 3, 2020, and entitled "Dislocator Chemistries for Turbine Abradable or Machinable Coating Systems", the disclosure of which is incorporated by reference herein in its entirety as if set forth at length.

BACKGROUND

The disclosure relates to gas turbine engine abradable coatings. More particularly, the disclosure relates to dislocators used to enhance abradability.

Gas turbine engines (used in propulsion and power applications and broadly inclusive of turbojets, turboprops, turbofans, turboshafts, industrial gas turbines, and the like) include components in rub interaction with each other wherein one of the components includes an abradable coating abraded by the other component (e.g. the other components substrate, or hard coating or abrasive coating). One key example is blade outer air seals (BOAS) which may be either full continuous annulus or segmented.

Often, coating abradability is achieved via porosity. For example, a typical abradable coating may comprise a stabilized zirconia (yttria-stabilized zirconia (YSZ) or gadolinia-stabilized zirconia (GSZ/GdZ/GZO)) atop the substrate (e.g., the inner diameter (ID) surface of a BOAS substrate). Relative to environmental barrier coating (EBC) and thermal barrier coating (TBC) ceramics, the abradable ceramic may be deposited with higher porosity. For example, in spray deposition, polymeric powder may be used as a fugitive porosity former blended with ceramic feedstock. The fugitive is then removed by heating (e.g., baking after application or in-service heating).

However, achieving abradability through open porosity has detriments. One detriment is that the porosity provides a path for oxygen or other reactive gas to penetrate toward the substrate and potentially compromise the bonding between the coating and the substrate. Another detriment is that, near the coating outer surface, the porosity provides a pathway for infiltration of molten contaminants from the environment such as CMAS (calcium-magnesium-aluminosilicate, also known as molten sand attack).

Additionally, traditional ceramics used on metallic substrates have disadvantages when applied to ceramic matrix composite (CMC) substrates. Specifically, stabilized zirconia (YSZ), which is used with metallic substrates has a coefficient of thermal expansion (CTE) that is much greater than that of CMC substrates. As a result, YSZ is susceptible to cracking and spallation during operation in a turbine engine. For CMC substrates, Zr, Hf, and rare earth silicate abradable coatings have been proposed to better match CTE. These may involve coatings that have porosity greater than 10 vol. % to enable wear. United States Patent Application Publication 20200055789A1 (the '789 publication), of Smyth, published Feb. 20, 2020, and entitled "Protective Coating for Ceramic Matrix Composites", the disclosure of which is incorporated by reference in its entirety herein as if set forth at length, discloses use of hafnium silicate (monosilicate) and ytterbium disilicate plus barium magnesium alumino silicate (BMAS) as a coating for a CMC BOAS segment.

With traditional metallic (e.g., MCrAlY) compressor (not turbine) abradable coatings, hexagonal boron nitride (hBN) is used as a dislocator in compressor abradable systems. A dislocator may fill porosity in the matrix while not compromising abradability. Specifically, the hBN dislocator prevents sintering of the matrix and is softer than the matrix so as to deform under shear. Thus, it keeps the coating relatively abradable over time. A metallic coating with 10 vol. % porosity and 10 vol. % hBN may be sufficiently abradable. However, hBN has poor oxidation/volatilization resistance at temperatures above approximately 1800° F. (982° C.), making it ineffective for turbine applications.

United States Patent Application Publication 20190093497A1 (the '497 publication), of Ndamka et al., published Mar. 28, 2019 and entitled "LOW POROSITY ABRADABLE COATING" discloses an abradable coating having a rare earth silicate matrix and dislocator phases of hafnium diboride ($HfB_2$), zirconium diboride ($ZrB_2$), tantalum carbide ($Ta_2C$), titanium diboride ($TiB_2$), zirconium carbide (ZrC), hafnium carbide (HfC), tantalum diboride ($TaB_2$), hafnium nitride (HfN), tantalum nitride (TaN or $Ta_2N$), niobium carbide (NbC), or combinations thereof.

United States Patent Application Publication 20190284673A1 (the '673 publication), of Landwehr et al., published Sep. 19, 2019 and entitled "COATING SYSTEM INCLUDING NUCLEATING AGENT" discloses use of a rare earth metal phosphate to induce crystallization of the molten CMAS. The nucleating agent is initially present in open porosity (e.g., having been infiltrated or having been deposited in a fugitive) rather than as a phase fully integrated into the matrix.

SUMMARY

One aspect of the disclosure involves a coated article comprising: a substrate; and a coating on the substrate including at least a first layer. The first layer comprises: a matrix; and a filler at 2.0% to 40% by volume in the first layer. The filler is selected from: alkaline earth or transition metal (M) tungstates ($MWO_4$); alkaline earth molybdates ($MMoO_4$); rare earth (RE) phosphates ($REPO_4$); and combinations thereof.

In a further embodiment of any of the foregoing embodiments, additionally and/or alternatively, the filler is at 5.0% to 30.0% by volume in the first layer.

In a further embodiment of any of the foregoing embodiments, additionally and/or alternatively, the first layer has 5.0% to 20% porosity.

In a further embodiment of any of the foregoing embodiments, additionally and/or alternatively, the filler comprises at 2.0% to 40% by volume in the first layer: $CaWO_4$; $BaWO_4$; $ZnWO_4$; $BaMoO_4$; $SrMoO_4$; $YPO_4$; $LaPO_4$; and combinations thereof.

In a further embodiment of any of the foregoing embodiments, additionally and/or alternatively, the filler comprises at 5.0% to 30% by volume in the first layer: $CaWO_4$; $BaWO_4$; $BaMoO_4$; $SrMoO_4$; and combinations thereof.

In a further embodiment of any of the foregoing embodiments, additionally and/or alternatively, the filler comprises at 5.0% to 30% by volume in the first layer: $CaWO_4$.

In a further embodiment of any of the foregoing embodiments, additionally and/or alternatively, the matrix comprises at least 50% by volume and/or weight one or more rare earth, zirconium, or hafnium silicates.

In a further embodiment of any of the foregoing embodiments, additionally and/or alternatively, the rare earth silicate comprises at least one of yttrium monosilicate, yttrium disilicate, ytterbium monosilicate, and ytterbium disilicate.

In a further embodiment of any of the foregoing embodiments, additionally and/or alternatively, the coated article further comprises: an environmental barrier layer between the substrate and the first layer and comprising at least 50% by volume and/or weight hafnium monosilicate.

In a further embodiment of any of the foregoing embodiments, additionally and/or alternatively, the substrate is a ceramic matrix composite.

In a further embodiment of any of the foregoing embodiments, additionally and/or alternatively, the coated article further comprises: a bond coat comprising a SiOC-BMAS mixture.

In a further embodiment of any of the foregoing embodiments, additionally and/or alternatively, the coated article further comprises: an environmental barrier layer between the substrate and the first layer and comprising at least 50% by volume and/or weight one or more rare earth, zirconium, or hafnium silicates.

In a further embodiment of any of the foregoing embodiments, additionally and/or alternatively, the filler has a melting point of 1450° C. to 2100° C.

In a further embodiment of any of the foregoing embodiments, additionally and/or alternatively, the filler has a melting point within 400° C. of melting points of a majority of the matrix by weight.

In a further embodiment of any of the foregoing embodiments, additionally and/or alternatively, the coating includes a bond coat between the substrate and the first layer.

In a further embodiment of any of the foregoing embodiments, additionally and/or alternatively, the coated article is a blade outer air seal wherein: the substrate has a concave inner diameter (ID) surface, the coating being on the ID surface.

In a further embodiment of any of the foregoing embodiments, additionally and/or alternatively, an engine comprises the blade outer air seal and further comprising: a stage of blades adjacent the ID surface.

In a further embodiment of any of the foregoing embodiments, additionally and/or alternatively, a method for using the engine comprises: rotating the stage of blades so that tips of the blades abrade the first layer.

In a further embodiment of any of the foregoing embodiments, additionally and/or alternatively, a method for manufacturing the coated article comprises applying the first layer by: air plasma spray or suspension plasma spray.

In a further embodiment of any of the foregoing embodiments, additionally and/or alternatively, the dislocator phase reduces the internal mechanical strength of the first coating.

In a further embodiment of any of the foregoing embodiments, additionally and/or alternatively, a manufacture method comprises co-spraying: a matrix-forming powder for forming the matrix; a filler powder for forming the filler; and optionally a fugitive (e.g., polymer such as polyester or polymethylmethacrylate (PMMA)) powder. The filler powder is selected from: alkaline earth or transition metal (M) tungstates ($MWO_4$); alkaline earth molybdates ($MMoO_4$); rare earth (RE) phosphates ($REPO_4$); and combinations thereof. Optionally, a heating removes the fugitive (e.g., to leave porosity).

A further aspect of the disclosure involves a coated article comprising: a substrate; and a coating on the substrate including at least a first layer. The first layer comprises: a matrix; and a filler at 2.0% to 40% by volume in the first layer, the filler having a melting point of 1450° C. to 2100° C. and having a 20° C. hardness of 3.8 to 5.2 mohs.

In a further embodiment of any of the foregoing embodiments, additionally and/or alternatively, the matrix comprises at least 50% by volume one or more rare earth silicates.

In a further embodiment of any of the foregoing embodiments, additionally and/or alternatively, the filler is at 5.0% to 30% by volume in the first layer and the filler is selected from: alkaline earth or transition metal (M) tungstates ($MWO_4$); alkaline earth molybdates ($MMoO_4$); rare earth (RE) phosphates ($REPO_4$); and combinations thereof.

In a further embodiment of any of the foregoing embodiments, additionally and/or alternatively, a manufacture method comprises co-spraying: a matrix-forming powder for forming the matrix; a filler powder for forming the filler; and optionally a fugitive powder. Optionally, a heating removes the fugitive (e.g., to leave porosity).

A further aspect of the disclosure involves a method for manufacturing a coated article, the coated article comprising: a substrate; and a coating on the substrate including at least a first layer. The method comprises: co-spraying: a matrix-forming powder; a filler powder; and a fugitive powder. The filler powder is selected from: alkaline earth or transition metal (M) tungstates ($MWO_4$); alkaline earth molybdates ($MMoO_4$); rare earth (RE) phosphates ($REPO_4$); and combinations thereof. A heating removes the fugitive.

In a further embodiment of any of the foregoing embodiments, additionally and/or alternatively, one or more of: the method comprises applying a bond coat prior to the spraying; the spraying is dry powder; and the matrix-forming powder and filler powder are pre-blended.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
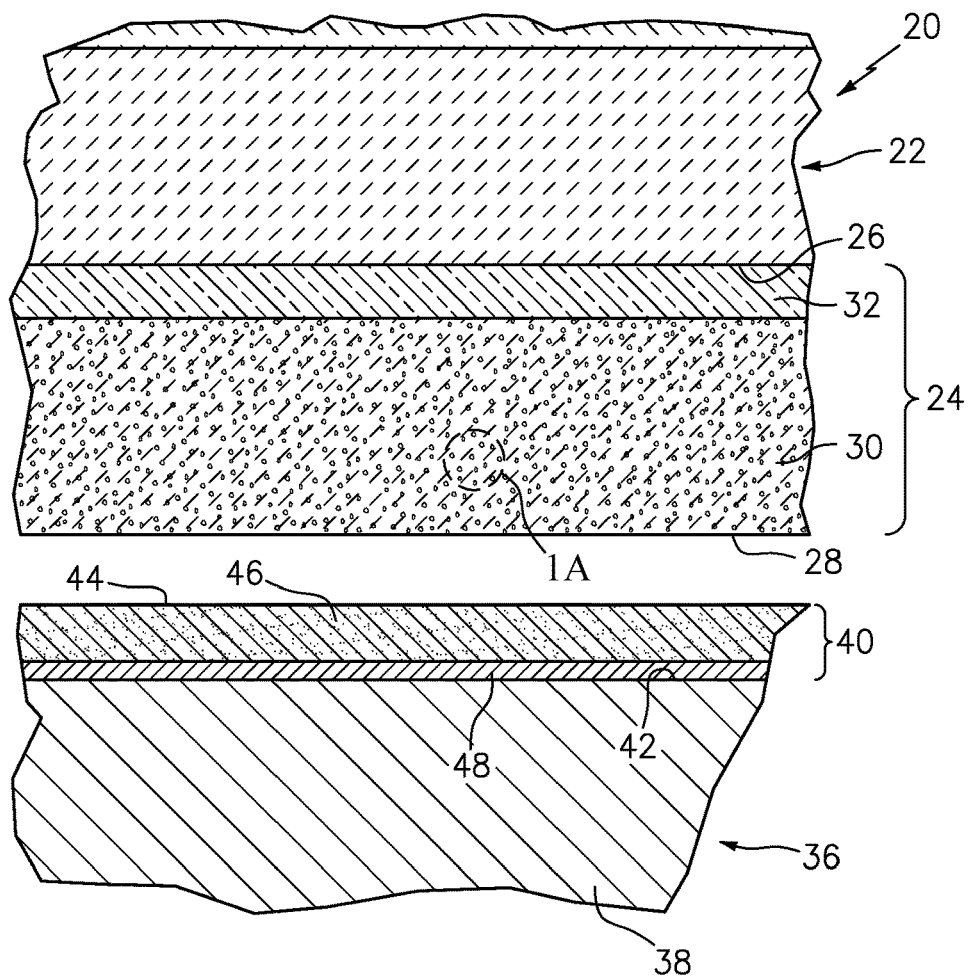
FIG. 1 is a sectional view of an abradable/abrasive interaction in a gas turbine engine.
Figure 2:
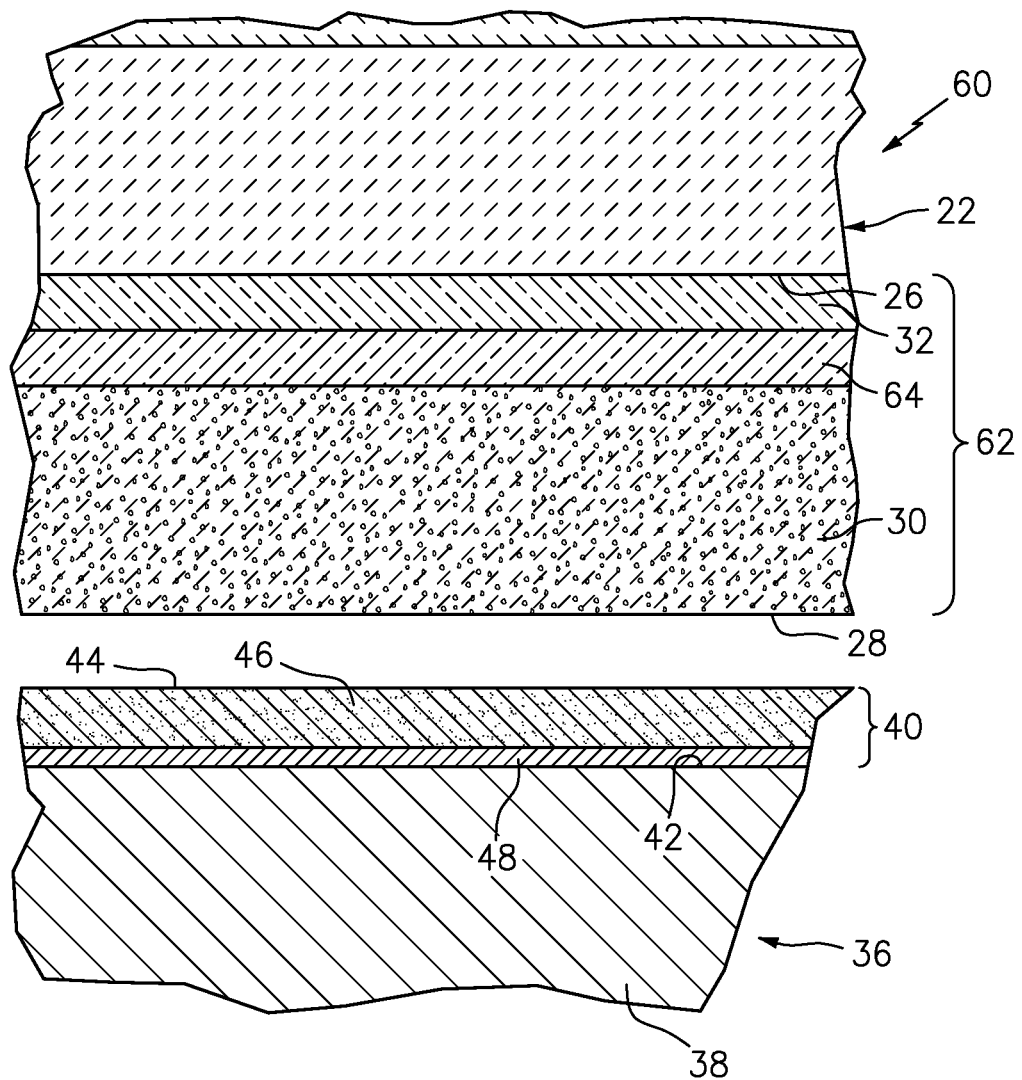
FIG. 2 is a sectional view of a further abradable/abrasive interaction in a gas turbine engine.

FIG. 1 shows a coated article 20 comprising a substrate 22 and a coating system 24 atop a surface 26 of the substrate and extending to an outer surface 28. The example substrate is a ceramic matrix composite (CMC) such as a SiC—SiC composite (see the '789 publication) or a monolithic ceramic. The coating system 24 includes an abradable layer (abradable coating) 30. The example FIG. 1 coating system includes a bond coat 32 directly atop the substrate surface. The bond coat is optional. However, further variations may include additional layers. FIG. 2 shows an additional layer 64 (in a coating system 62 of a coated article 60 otherwise similar to coated article 20) in addition to or alternatively to the bond coat 32 and which may serve as a barrier layer.

The article 20 interfaces with a second article 36 comprising a substrate 38 and a coating system 40 atop a surface 42 of the substrate and extending to an outer surface 44. The example substrate 38 is a metallic substrate such as a nickel-based superalloy. The coating system 40 includes an abrasive layer (abrasive coating) 46. The example coating system 40 includes a bond coat 48 directly atop the substrate surface. An example abrasive layer comprises a cubic boron nitride (cBN) abrasive in a metallic (e.g., MCrAlY) matrix. An example abrasive layer application is via electrolytic deposition (plating) of the metal (M—Ni and/or Co and/or Fe) with the addition of the abrasive (e.g., cBN) particles and with or without the addition of metal particles (e.g., the CrAlY) required in order to achieve an alloyed matrix. An example bond coat 48 is Ni (e.g., essentially pure such as at least 95.0% or at least 99.0% Ni by weight). An example Ni bond coat application is via electrolytic deposition.

In one group of examples, the first article 20 is a blade outer airseal (BOAS) or segment thereof with the surfaces 26 and 28 being inner diameter (ID) surfaces. The second article 36 is a blade of a blade stage with the surfaces 42 and 44 being tip/outer diameter (OD) surfaces.

Figure 1A:
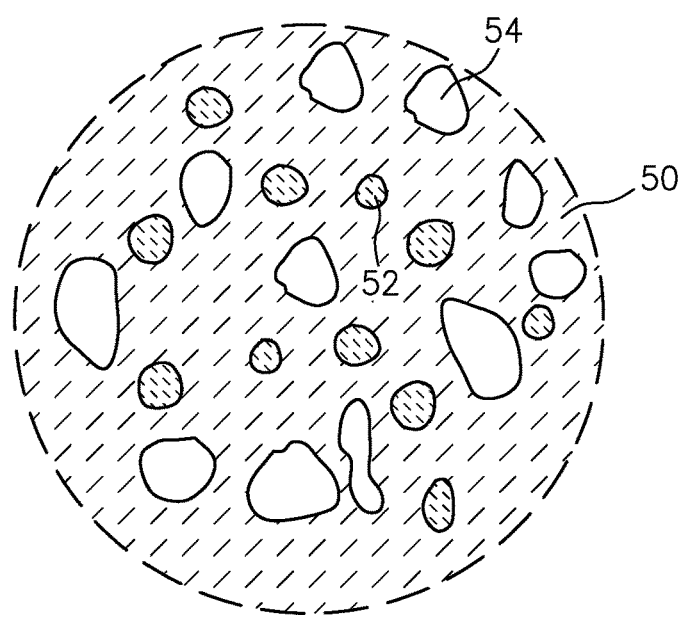
FIG. 1A is an enlarged view of an abradable coating.

The abradable layer 30 comprises a matrix 50 (FIG. 1A) and a filler 52. The abradable layer may further include unfilled porosity 54. The example matrix comprises one or more rare earth, hafnium (Hf), or zirconium (Zr) silicates, where the rare earths are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y). Hafnium, zirconium and rare earths form stable silicate compounds. Hafnium and zirconium have different reactivates than rare earths which may influence the selection of hafnium or zirconium for a particular application. Particular candidate matrix materials are ytterbium silicates such as ytterbium monosilicate ($Yb_2SiO_5$), ytterbium disilicate ($Yb_2Si_2O_7$), hafnium monosilicate ($HfSiO_4$), yttrium monosilicate ($Y_2SiO_5$), and combinations thereof. These are advantageous because the coefficient of thermal expansion (CTE) of these materials are similar to SiC—SiC composites, which promotes coating durability during engine operation. Yttrium disilicate ($Y_2Si_2O_7$) has four stable crystal structures at different temperatures, with phase changes potentially causing cracking. A more specific matrix example involves a sprayed ytterbium disilicate ($Yb_2Si_2O_7$) where silicon attrition has converted a minority (e.g., 5.0-20.0% by weight to monosilicate). Hafnium monosilicate (also simply called hafnium silicate) may perform more like ytterbium disilicate than it does ytterbium monosilicate due to the nominal 1:1 ratio of Hf to Si.

An alternative matrix 50 is zirconium monosilicate ($ZrSiO_4$). This is useful because the zirconium, like hafnium, may be less reactive with bond coat materials than the ytterbium. Again, these may be pure, essentially pure (e.g., subject to inevitable or commercial impurities, silicon attrition, and the like), or may have intentional additions. Relative to Hf, Zr oxides from the zirconium monosilicate may have a greater tendency to produce cracking and thus be less desirable. Example impurities in matrix and filler combined are no greater than 5.0 weight percent overall for the barrier or abradable coating.

The filler 52 is selected to act as a dislocator in the matrix. The '497 publication uses very hard dislocator particles with shear strength exceeding the matrix, presumably creating a mechanical mismatch that will aid abradability within the matrix or solely along the matrix-dislocator interfaces. These nitride, carbide, and diboride phases have poor oxidation/volatilization resistance, potentially attritting in high temperature and/or highly oxidative conditions.

In contrast to the '497 publication, the dislocator 52 is selected to have a different relationship to the matrix. For example, the dislocator 52 may have a lower shear strength than the matrix to aid abradability through deformation within the dislocator phase in addition to along the interfaces. For example $CaWO_4$ as a dislocator addition has a lower shear strength than ytterbium disilicate, resulting in a composite coating with shear strength below monolithic ytterbium disilicate and hence reducing the work required for abrasion during engine rub. The lower shear strength is correlated with lower melting temperature and lower hardness (see Table I discussed below). For a given abradability, the use of a dislocator reduces open porosity relative to an abradable consisting of the matrix and open porosity. This reduces opportunity for gas or other penetration toward the substrate.

The dislocator 52 may have a melting temperature effective to allow thermal spray codeposition with the matrix but sufficiently high to retain structural stability during operation in a gas turbine. Due to the deformability, candidate materials will likely have melting temperatures less than those of the '497 publication (e.g., up to somewhat over 2070° C. for the example of $LaPO_4$ (e.g., up to about 2500° C. or 2600° C.). Example dislocator melting points are within 500° C. of (not more than 500° C. from) the melting points of the matrix (e.g., of at least a majority by weight of the matrix or at least 75% by weight or at least 90% by weight), more narrowly within 400° C. or within 300° C.

Candidate dislocators are alkaline earth or transition metal (M) tungstates ($MWO_4$), alkaline earth molybdates ($MMoO_4$), or rare earth (RE) phosphates ($REPO_4$) where particular candidate alkaline earths are Mg, Ca, Sr and Ba; particular candidate transition metals are Zn, Cd, Ni, and Co; and particular candidate rare earths are La and Y. These particular candidates are chosen based on published melting temperature above 2500° F. (1371° C.) and resistance to oxidation/degradation are shown in Table I below. Candidate 20° C. hardness is 3.6 to 5.4 moh, more particularly 3.8 to 5.2 moh.

TABLE I

| | Dislocator Properties | | | | | | |
|---|---|---|---|---|---|---|---|
| | Melting Temperature | | Hardness (room temp 20° C.) | Vapor Pressure | | | |
| Dislocator | ° C. | ° F. | moh | atm | Species | atm | Species |
| $CaWO_4$ | 1650 | 3002 | 4.8* | 8.54E−08 | $Ca(OH)_2$ | 3.68E−07 | $WO_2(OH)_2$ |
| $BaWO_4$ | 1475 | 2687 | 4-5** | 3.09E−08 | $Ba(OH)_2$ | 3.09E−08 | $WO_2(OH)_2$ |
| $ZnWO_4$ | 1875 | 3407 | 4-4.5# | 6.21E−05 | Zn | 2.79E−04 | $WO_2(OH)_2$ |

TABLE I-continued

Dislocator Properties

| Dislocator | Melting Temperature °C. | Melting Temperature °F. | Hardness (room temp 20° C.) moh | Vapor Pressure atm | Species | atm | Species |
|---|---|---|---|---|---|---|---|
| BaMoO$_4$ | 1450 | 2642 | 3-4### | 5.21E−06 | Ba(OH)$_2$ | 5.21E−06 | MoO$_2$(OH)$_2$ |
| SrMoO$_4$ | 1490 | 2714 | 4### | 1.43E−06 | Sr(OH)$_2$ | 1.43E−06 | MoO$_2$(OH)$_2$ |
| YPO$_4$ | 1995 | 3623 | 4-5^ | 3.35E−15 | Y(OH)$_3$ | 1.03E−02 | P$_2$O$_5$ |
| LaPO$_4$ | 2070 | 3758 | 5^^ | 2.87E−11 | La(OH)$_3$ | 1.03E−02 | P$_2$O$_5$ |

*MatWeb Ceramics Material Data Sheets (MDS);
**CRC Handbook of Metal Etchants;
Belli, P. et al., "Radioactive contamination of ZnWO$_4$ crystal scintillators", *Nuclear Instruments and Methods in Physics Research Section A: Accelerators, Spectrometers, Detectors and Associated Equipment*, Jan. 11-21, 2011, pp. 31-38, Vols. 626-627, Elsevier B. V., Amsterdam, The Netherlands https://doi.org/10.1016/j.nima.2010.10.027;
Arora, S. K., Rao, G. T. and Batra, N. M., 1984. Vickers micromechanical indentation of BaMoO 4 crystals. *Journal of materials science*, January, 1984, pp. 297-302. Vol. 19(1), Springer Nature, Berlin Germany (Vickers hardness at 100 g ranges between 80 and 150 kg/mm$^2$ - converts to a mohs hardness between 3 and 4);
"Barium & Strontium tungstate-molybdate - CRYSTALS FOR RAMAN SHIFT", EKSMA Optics, UAB, June, 2019, Vilnius, Lithuania http://eksmaoptics.com/out/media/EKSMA_Optics_Crystals_for_Raman_Shift.pdf;
^Mogilevsky, P., Zaretsky, E. B., Parthasarathy, T. A. et al., "Composition, lattice parameters, and room temperature elastic constants of natural single crystal xenotime from Novo Horizonte", *Phys Chem Minerals*, Nov. 3, 2006, pp. 691-698 Vol. 33, Springer-Verlag GmbH, Berlin Germany. https://doi.org/10.1007/s00269-006-0118-6;
^^Peter E. D. Morgan, David B. Marshall, Robert M. Housley, "High-temperature stability of monazite-alumina composites", Materials Science and Engineering: A, Jun. 1, 1995, pp. 215-222, Vol. 195, Elsevier B. V., Amsterdam, The Netherlands. https://doi.org/10.1016/0921-5093(94)06521-7

Candidate matrix materials are shown in Table II:

TABLE II

Matrix Melting temperatures

| Matrix | Melting Temperature °C. | Melting Temperature °F. |
|---|---|---|
| Y$_2$SiO$_5$ | 1975 | 3587 |
| Y$_2$Si$_2$O$_7$ | 1800 | 3272 |
| Yb$_2$SiO$_5$ | 1950 | 3542 |
| Yb$_2$Si$_2$O$_7$ | 1850 | 3362 |
| ZrSiO$_4$ | 1675 | 3047 |
| HfSiO$_4$ | 1750 | 3182 |

The calculated vapor pressure of gaseous species in equilibrium with the dislocator and a gas mixture of 0.2 atm O2 and 0.1 atm H$_2$O at 1371° C. For a compound of the form ABO$_x$, the highest vapor pressure species associated with A and B are listed in the table. These are contrasted with hBN (sublimation temperature of 3552° C.) where the highest vapor pressure species are BO(OH) with a vapor pressure of $3.7 \times 10^{-3}$ atm and HBO with a vapor pressure of $7.3 \times 10^{-4}$ atm under the identified test condition. The melting points are about 1000° C. less than hafnium diboride at 3250° C. and tantalum nitride at 3090° C. An example melting point range is 1000° C. to 2500° C., more narrowly 1450° C. to 2100° C.

From a vapor pressure perspective, CaWO$_4$, BaWO$_4$, BaMoO$_4$, and SrMoO$_4$ are favorable candidates.

Particular dislocator examples based on commercial availability and demonstrated properties are CaWO$_4$, LaPO$_4$, and YPO$_4$. Commercial sources of CaWO$_4$ (scheelite) and associated data on deformability are readily available. BaWO$_4$, ZnWO$_4$, BaMoO$_4$, and SrMoO$_4$ all share the same crystal structure as CaWO$_4$ and are chemically similar, likely offering similar properties including low hardness. YPO$_4$ and LaPO$_4$ offer similarly low hardness as the tungstate and molybdate chemistries above but with a slightly higher melting temperature and a different crystal structure which could improve rub response. LaPO$_4$ and YPO$_4$ are, thus, particularly promising for higher temperature turbine sections (e.g., the first stage of the turbine (high pressure turbine in a multi-spool engine)). The CaWO$_4$ melting point is also relatively close to likely matrix melting points (contrasted with the Ba and Sr compounds) to provide favorable co-spray. YPO$_4$ and LaPO$_4$ are both rare-earth orthophosphate that have demonstrated low shear strengths. These are available in various purities as xenotime-(Y) and monazite-(La), respectively.

In a first group of examples, the substrate 22 is a SiC/SiC ceramic matrix composite substrate. Optionally, the bond coat 32 (if present) and/or an environmental barrier coating (EBC) layer 64 (FIG. 2, if present) may intervene between the substrate 22 and the abradable layer 30. The bond coat 32, when present, may include silicon. Example bond coats 32 include those having a barium-magnesium-alumino-silicate (BMAS) matrix and dispersed particles of silicon oxycarbide (e.g., as described in US Patent Publication No. 2016/0332922A1 (the '922 publication, of Tang et al., published Nov. 17, 2016, and entitled "SILICON OXYCARBIDE ENVIRONMENTAL BARRIER COATING"), silicon oxycarbide (e.g., as described in U.S. Patent Publication No. 2012/0328886A1 (the '886 publication, of Schmidt et al., published Dec. 27, 2012 and entitled "COMPOSITE ARTICLE INCLUDING SILICON OXYCARBIDE LAYER"), and a combination of silicon oxycarbide and calcium magnesium alumino silicate (CMAS) (e.g., as described in in U.S. Patent Publication No. 2016/0333454A1 (the '454 publication), of Tang et al., published Nov. 17, 2016, and entitled "SILICON OXYCARBIDE-BASED ENVIRONMENTAL BARRIER COATING"), the disclosures of which '922, '886, and '454 publications are incorporated by reference in their entireties herein as if set forth at length.

The example bond coat may be applied by slurry deposition. Alterative techniques include air plasma spray. The bond coat may oxidize in service to form a silicon oxide layer positioned between the bond coat and the layer above it (either the top coat or the multi-phase abradable coating). The bond coat may have a thickness of 2.0 to 15.0 mils (0.051 to 0.38 mm), or, more specifically, 5.0 to 10.0 mils (0.13 to 0.25 mm). The bond coat may have a porosity of 0 to 20%, or, more specifically, 1.0 to 10.0% or 1.0 to 5.0%.

Example EBC materials are the matrix 50 candidates disclosed herein. In one group of examples, the EBC is applied from a source of the same matrix material used in the abradable (e.g., but with no or less fugitive and/or dislocator). Similar application techniques may be used. Or the EBC and matrix may be different. One particular example of the EBC is $HfSiO_4$. $HfSiO_4$ may be particularly relevant for use with matrices other than $HfSiO_4$. because it is less reactive with bond coat material than are the rare earth silicates. The EBC may have a thickness of 1 to 10 mils (0.025 to 0.25 mm), or, more specifically, 2 to 7 mils (0.051 to 0.18 mm). The EBC may have a porosity of 0 to 20%, or, more specifically, 1 to 5%.

An abradable coating layer is deposited on top of the bond coat (if present or EBC if present) by thermal spray such as air plasma spray (APS), suspension plasma spray (SPS), or the like. One particular example of an abradable coating layer is fabricated using a combination of ytterbium disilicate ($Yb_2Si_2O_7$) matrix input powder, polyester fugitive input powder, and a calcium tungstate ($CaWO_4$) dislocator input powder. In this example the polyester fugitive powder comprises 10% by volume of the input powder, the calcium tungstate powder comprises 20% by volume of the input powder, and the ytterbium disilicate powder comprises the balance. A broader range of fugitive is 0 to 30% by volume or 5.0% to 30.0% or 5.0% to 20.0% and a broader range of dislocator is 2.0% to 40% or 5.0% to 30% or 10.0% to 25.0%. Matrix may be an example at least 40% or an at least 50% (e.g., 40% to 70%). The as-sprayed layer may consist of or consist essentially of the matrix, fugitive, and dislocator. There may be impurities or even intended additions.

The ytterbium disilicate ($Yb_2Si_2O_7$) may be converted partially into a combination of ytterbium monosilicate ($Yb_2SiO_5$) and silica ($SiO_2$) during the air plasma spray process. The calcium tungstate ($CaWO_4$) may be converted partially into calcium oxide (CaO) and tungstate ($WO_3$) during the air plasma spray process. The ytterbium disilicate ($Yb_2Si_2O_7$) matrix input powder, the polyester input powder, and the calcium tungstate ($CaWO_4$) dislocator input powder may be blended together into a single composite powder before spray, into any pairwise combination composite powders, or may be injected separately into the air plasma spray plume. The resulting abradable layer may be between 0.010 inch and 0.080 inch thick (0.25 mm to 2.0 mm). The resulting abradable may have a porosity similar to the fugitive volume percentage.

In a second group of examples, the substrate is metallic (e.g., a single crystal metallic Ni superalloy produced by casting). An MCrAlY bond coat is applied on top of the substrate by thermal spray (e.g., air plasma spray); the bond coat thickness may be between 0.002 inch and 0.020 inch (0.051 mm to 0.51 mm). The abradable coating layer comprises a stabilized zirconia (yttria-stabilized zirconia (YSZ) and/or gadolinia-stabilized zirconia (GSZ GdZ or GZO) and a dislocator applied by thermal spray (e.g., air plasma spray). Example spray feedstock comprises a mixture of yttria stabilized zirconia (e.g., 7-20 weight percent yttria)) matrix input powder, polyester fugitive input powder, and a calcium tungstate ($CaWO_4$) dislocator input powder. Volume percentages may be similar to the first group of examples.

The calcium tungstate ($CaWO_4$) may be converted partially into calcium oxide (CaO) and tungstate ($WO_3$) during the air plasma spray process. The yttria stabilized zirconia matrix input powder, the polyester input powder, and the calcium tungstate ($CaWO_4$) dislocator input powder may be blended together into a single composite powder before spray, into any pairwise combination composite powders, or may be injected separately into the air plasma spray plume. The resulting abradable layer may be between 0.010 inch and 0.080 inch thick (0.25 mm to 2.0 mm).

In an example of the abrasive coating, the substrate 38 (e.g., blade substrate) is metallic (e.g., a Ni superalloy produced by casting). A bond coat of Ni electroplated from a Watts Ni solution is applied to a thickness of between 0.0001 inch and 0.002 inch resulting in a layer with >95% pure Ni containing trace impurities of Co, Fe, and other transition metals.

An abrasive layer matrix is deposited on top of the bond coat; the abrasive layer matrix is a NiCrAlY coating produced by electrodeposition of Ni from a Ni-sulfamate solution with suspended particles of CrAlY which are subsequently entrapped in the coating during plating and diffused to form an alloy in a post-plating heat treat. Also entrapped in the matrix coating are cubic boron nitride (cBN) abrasive particles.

Alternative second members 36 may comprise CMC or monolithic ceramic substrates (e.g., CMC blades with or without abrasive or hard coating).

Further coating examples are shown in Table III:

TABLE III

Coating Combinations

| | | Bond coat | | Abradable | | | | |
|---|---|---|---|---|---|---|---|---|
| Example | Substrate | Material | Method | Matrix | Filler | Fugitive | Method | Other |
| 1 | SiC—SiC | Si | EB-PVD | $Yb_2SiO_5$ | $CaWO_4$ | polyester | SPS | |
| 2 | SiC—SiC | Si | APS | $Yb_2SiO_5$ | $CaWO_4$ | polyester | SPS | |
| 3 | SiC—SiC | SiOC-BMAS | Slurry | $Yb_2SiO_5$ | $CaWO_4$ | polyester | APS | |
| 4 | SiC—SiC | SiOC-BMAS | Slurry | $Yb_2SiO_5$ | $CaWO_4$ | polyester | APS | APS $HfSiO_4$ EBC |
| 5 | SiC—SiC | SiOC-BMAS | Slurry | $Yb_2Si_2O_7$ | $CaWO_4$ | polyester | APS | APS $HfSiO_4$ EBC |
| 6 | SiC—SiC | SiOC-BMAS | Slurry | $HfSiO_4$ | $CaWO_4$ | polyester | APS | |
| 7 | SiC—SiC | SiOC-BMAS | Slurry | $Y_2SiO_5$ | $CaWO_4$ | polyester | APS | APS $HfSiO_4$ EBC |
| 8 | SiC—SiC | SiOC-BMAS | Slurry | $Yb_2Si_2O_7$ | $CaWO_4$ | polyester | APS | |
| 9 | SiC—SiC | SiOC-BMAS | Slurry | $Yb_2SiO_5$ | $BaMoO_4$ | polyester | APS | |
| 10 | SiC—SiC | SiOC-BMAS | Slurry | $Yb_2SiO_5$ | $BaMoO_4$ | polyester | APS | APS $HfSiO_4$ EBC |
| 11 | SiC—SiC | SiOC-BMAS | Slurry | $Yb_2Si_2O_7$ | $BaMoO_4$ | polyester | APS | |
| 12 | SiC—SiC | SiOC-BMAS | Slurry | $Yb_2SiO_5$ | $YPO_4$ | polyester | APS | |

TABLE III-continued

Coating Combinations

| | | Bond coat | | Abradable | | | | |
|---|---|---|---|---|---|---|---|---|
| Example | Substrate | Material | Method | Matrix | Filler | Fugitive | Method | Other |
| 13 | SiC—SiC | SiOC-BMAS | Slurry | HfSiO4 | CaWO$_4$ | polyester | APS | APS HfSiO$_4$ EBC |
| 14 | SiC—SiC | SiOC-BMAS | Slurry | Yb$_2$Si$_2$O$_7$ | CaWO$_4$ | PMMA | APS | |
| 15 | Ni superalloy | MCrAlY | APS | 7YSZ | CaWO$_4$ | polyester | APS | |
| 16 | Ni superalloy | MCrAlY | APS | 7YSZ | YPO$_4$ | polyester | APS | |
| 17 | Ni superalloy | MCrAlY | APS | 7YSZ | BaMoO$_4$ | polyester | APS | |

The Table III examples are non-limiting and further examples may be provided by alternatively mixing layers or components from those examples or from elsewhere in the disclosure. In an example application method, air plasma spray is used to spray a pre-blended mixture of matrix powder(s) and dislocator powder(s), and optionally the fugitive. Fugitive introduction may be separate due to extremely lower melting point and related concerns (e.g., introduced relatively downstream or to a cooler region of the plasma). As noted above, a particular example of separate introduction of matrix and dislocator is where the matrix material alone is used for an EBC layer and it is not desired to switch out sources or switch spray apparatus.

Regarding Table III Ex. 1 and 2, APS is less expensive than EB-PVD and would be used to deposit Si in most cases. Regarding Ex. 5 and 8, if no additional EBC layer is used, Yb$_2$Si$_2$O$_7$ may be more useful than Yb$_2$SiO$_5$ because the CTE is lower and therefore a thicker coating can be used (similar for Ex. 10 and 11).

Example dislocator particle size measured as a powder (e.g., D50) is 10 micrometers to 100 micrometers, more narrowly 15 micrometers to 45 micrometers or about 25 micrometers. Example porosity size measured in the deposited coating (e.g., measured by/as area fraction of porosity in cross section images of the as-deposited coating) is 1.0 micrometer to 100 micrometers, more narrowly 5.0 micrometers to 25 micrometers.

In addition to use in abradable coating systems, the dislocators may be used in machinable coating systems. Machinable coating systems are used, for example, on the contact faces of turbine components. One example is along the root of a blade that is slid into a rotor or disk. In a machinable coating system, the dislocators may function to enable removal of the coating from the as-deposited thickness to fit specific dimensions.

An example of use of the dislocator 52 in a machinable coating is CaWO$_4$ dislocators in an Yb$_2$Si$_2$O$_7$ matrix. The addition of a dislocator to the matrix improves machinability in the same way that the dislocators improve abradability of the abradable coatings. The improved machinability is associated with lower tool loads, lower heat generation, and as a result improved surface quality and lower propensity for cracking and failure during machining.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A coated article being a blade outer air seal comprising:
a substrate having a concave inner diameter (ID) surface; and
a coating on the substrate ID surface including at least a first layer,
wherein the first layer comprises:
a matrix; and
a filler at 2.0% to 40% by volume in the first layer selected from:
alkaline earth or transition metal tungstates;
alkaline earth molybdates;
rare earth phosphates; and
combinations thereof,
wherein the filler comprises at 5.0% to 30% by volume in the first layer one or a combination of:
CaWO$_4$;
BaWO$_4$;
BaMoO$_4$; and
SrMoO$_4$.

2. The coated article of claim 1 wherein:
the filler is at 5.0% to 30.0% by volume in the first layer.

3. The coated article of claim 1 wherein:
the first layer has 5.0% to 20% porosity.

4. The coated article of claim 1 wherein:
the filler comprises at 5.0% to 30% by volume in the first layer:
CaWO$_4$.

5. The coated article of claim 1 wherein:
the matrix comprises at least 50% by volume one or more rare earth, zirconium, or hafnium silicates.

6. The coated article of claim 5 wherein:
the rare earth silicate comprises at least one of yttrium monosilicate, yttrium disilicate, ytterbium monosilicate, and ytterbium disilicate.

7. The coated article of claim 6 further comprising:
an environmental barrier layer between the substrate and the first layer and comprising at least 50% by volume hafnium monosilicate.

8. The coated article of claim 1 wherein:
the substrate is a ceramic matrix composite.

9. The coated article of claim 1 further comprising:
a bond coat comprising a SiOC-BMAS mixture.

10. The coated article of claim 1 further comprising:
an environmental barrier layer between the substrate and the first layer and comprising at least 50% by volume one or more rare earth, zirconium, or hafnium silicates.

11. The coated article of claim 1 wherein:
the filler has a melting point of 1450° C. to 2100° C.

12. The coated article of claim 1 wherein:
the filler has a melting point within 400° C. of melting points of a majority of the matrix by weight.

13. The coated article of claim 1 wherein:
the coating includes a bond coat between the substrate and the first layer.

14. An engine comprising the blade outer air seal of claim 1 and further comprising:
a stage of blades adjacent the ID surface.

15. A method for manufacturing the blade outer air seal of claim 1, the method comprising:
co-spraying:
a matrix-forming powder;
the filler as a powder; and
a fugitive powder; and
heating to remove the fugitive.

16. The method of claim 15 wherein one or more of:
the method comprises applying a bond coat prior to the spraying;
the spraying is dry powder; and
the matrix-forming powder and the filler powder are pre-blended.

17. A coated article being a blade outer air seal comprising:
a substrate having a concave inner diameter (ID) surface; and
a coating on the substrate ID surface including at least a bond coat and a first layer,
wherein:
the bond coat comprises a SiOC-BMAS mixture; and
the first layer comprises:
a matrix; and
a filler at 2.0% to 40% by volume in the first layer selected from:
alkaline earth or transition metal tungstates;
alkaline earth molybdates;
rare earth phosphates; and
combinations thereof.

18. The coated article of claim 17 wherein:
the coating includes a bond coat between the substrate and the first layer.

19. The coated article of claim 17 wherein:
the substrate is a ceramic matrix composite.

* * * * *